(12) United States Patent
Shaikh et al.

(10) Patent No.: US 10,575,358 B2
(45) Date of Patent: Feb. 25, 2020

(54) METHOD AND SYSTEM FOR INTERNETWORKING WITH FUTURE GENERATION NETWORK

(71) Applicant: Verizon Patent and Licensing Inc., Arlington, VA (US)

(72) Inventors: Imtiaz Shaikh, Irving, TX (US); Arda Aksu, Lafayette, CA (US); Michael Kondratiuk, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 15/933,716

(22) Filed: Mar. 23, 2018

(65) Prior Publication Data

US 2019/0297660 A1 Sep. 26, 2019

(51) Int. Cl.
| | |
|---|---|
| *H04W 76/16* | (2018.01) |
| *H04W 48/18* | (2009.01) |
| *H04W 72/04* | (2009.01) |
| *H04W 36/14* | (2009.01) |
| H04W 88/10 | (2009.01) |

(52) U.S. Cl.
CPC .......... *H04W 76/16* (2018.02); *H04W 36/14* (2013.01); *H04W 48/18* (2013.01); *H04W 72/0406* (2013.01); *H04W 88/10* (2013.01)

(58) Field of Classification Search
CPC . H04W 76/16; H04W 48/18; H04W 72/0406; H04W 36/14; H04W 88/10
See application file for complete search history.

(56) References Cited

U.S. PATENT DOCUMENTS

| | | | |
|---|---|---|---|
| 2018/0103381 A1* | 4/2018 | Ramamurthi | H04W 16/28 |
| 2018/0352491 A1* | 12/2018 | Shih | H04W 36/14 |
| 2019/0215897 A1* | 7/2019 | Babaei | H04W 76/28 |
| 2019/0222282 A1* | 7/2019 | Tsai | H04W 72/1284 |
| 2019/0230625 A1* | 7/2019 | Kim | H04W 8/02 |
| 2019/0246421 A1* | 8/2019 | Zhou | H04L 5/0048 |
| 2019/0246442 A1* | 8/2019 | Park | H04L 5/0055 |
| 2019/0253197 A1* | 8/2019 | Babaei | H04L 1/1812 |
| 2019/0254042 A1* | 8/2019 | Cirik | H04L 1/203 |
| 2019/0261314 A1* | 8/2019 | Byun | H04W 8/085 |
| 2019/0261425 A1* | 8/2019 | Park | H04W 72/042 |
| 2019/0281651 A1* | 9/2019 | Lee | H04W 76/28 |
| 2019/0289504 A1* | 9/2019 | Kim | H04W 36/0085 |
| 2019/0289506 A1* | 9/2019 | Park | H04W 8/08 |
| 2019/0297538 A1* | 9/2019 | Keller | H04W 36/0022 |

\* cited by examiner

*Primary Examiner* — Ajay Cattungal (57) ABSTRACT

A method, a device, and a non-transitory storage medium are described in which a network device of a radio access network receives a message, from an end device, that includes capability information of the end device, and the network device includes a first network interface to a first core network and a second network interface to a second core network. The network device determines whether to establish a first bearer, which pertains to the end device, with the first core network via the first network interface, or a second bearer, which pertains to the end device, with the second core network via the second network interface based on the capability information. The network device establishes the first bearer or the second bearer based on the determination.

20 Claims, 9 Drawing Sheets

METHOD AND SYSTEM FOR INTERNETWORKING WITH FUTURE GENERATION NETWORK

BACKGROUND

The development and design of future generation wireless networks (e.g., Fifth Generation (5G) networks) is currently underway by various organizations, service providers, and so forth. For example, the development and design of a network may be based on cloud technologies, software defined networking (SDN), and network function virtualization (NFV).

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

A wireless network should support various use cases, meet various performance metrics, allow for scalability and flexibility, and so forth. However, in the design of the wireless network, there are legacy issues relating to existing wireless networks. For example, there are considerations relating to whether there will be internetworking between the wireless network, which includes various network devices, and a legacy wireless network, which includes various legacy network devices, and if so, how such an internetworking will be implemented.

Depending on how internetworking is configured, such configuration can yield undesirable results. For example, from a network perspective, the configuration may reduce effective use of available network resources. By way of further example, in a Fifth Generation (5G) wireless network context, a first type of next generation Node B (gNB) may be configured to connect to only a legacy core network (e.g., an Evolved Packet Core (EPC) network of a Long Term Evolution (LTE) network or an LTE-Advanced (LTE-A) network). For example, the first type of gNB may be implemented as an Evolved Universal Radio Access-New Radio (E-UTRA-NR) gNB (en-gNB). Under some configurations, legacy core networks may not fully support the bandwidth afforded by the air interface of the next generation base station, may limit the availability of certain types of network services/applications to end users, hinder quality of service, cause a congested state related to a network resource (e.g., memory, processor, communication interface, communication link, etc.), invoke reactive measures to be executed by the wireless network (e.g., a cell reselection procedure, invoke a handover procedure, etc.), and/or other types of negative results.

For example, a second type of gNB may be configured to connect to only a next generation core (NGC) network (e.g., a 5G core (5GC) network). However, from a network perspective, the configuration may reduce the effective use of available network resources. According to this configuration, the network resources of the 5G core network may be over utilized, while network resources of the EPC network, which may fully support certain types of network services/applications, may be under-utilized. In turn, such configurations may cause a congested state related to a network resource, hinder quality of service, invoke reactive measures to be executed by the network, and so forth.

Additionally, from an end device perspective, the end device may be compatible with both a legacy network and a future generation wireless network, but may be limited to always use the future generation wireless network based on the configuration of internetworking and the types of gNBs. According to other examples, depending on the capability of an end device, the end device may or may not be able to use the future generation core network. For example, the end device may be able to use only an EPC network, while another end device may be able to use both the EPC network and the 5G core network. In either case, the end device may be configured to connect to a type of gNB. However, the type of gNB may not fully support end devices that have these differing capabilities.

According to exemplary embodiments, an internetworking service is described. According to exemplary embodiments, a network device of a wireless access network is configured to connect to a future generation core network and a different generation core network. According to an exemplary embodiment, the network device is configured to connect to a 5G core network and an EPC network (e.g., a 4G core network or a 4.5G core network). According to an exemplary embodiment, the network device is implemented as a gNB. According to another exemplary embodiment, the network device may be implemented as another type of wireless device included in an access network. According to an exemplary embodiment, the gNB is configured to connect to an eNB and an Evolved LTE (eLTE) eNB. According to an exemplary implementation, the gNB includes an X2 interface to connect to the eNB, and an Xn interface to connect to the eLTE eNB. According to another exemplary embodiment, the gNB is configured to connect to other wireless nodes (e.g., a WiFi node, a small cell node, a macro cell node, etc.), as described herein.

As a result, the internetworking service may improve network resource utilization in a network. For example, the internetworking service may improve the use of various network resources (e.g., physical, logical, virtual) in relation to network devices of an access network and a core network. Additionally, the internetworking service may improve a connectivity service between end devices with differing capabilities and a core network. For example, in contrast to having a first type of gNB that is configured to connect to only a 5G core network and a second type of gNB that is configured to connect to only an EPC/4G core network, the number of gNBs may be minimized based on the internetworking service, as described herein. For example, according to an exemplary embodiment, the gNB includes logic to select and connect to the appropriate core network based on the capability of the end device.

Figure 1:
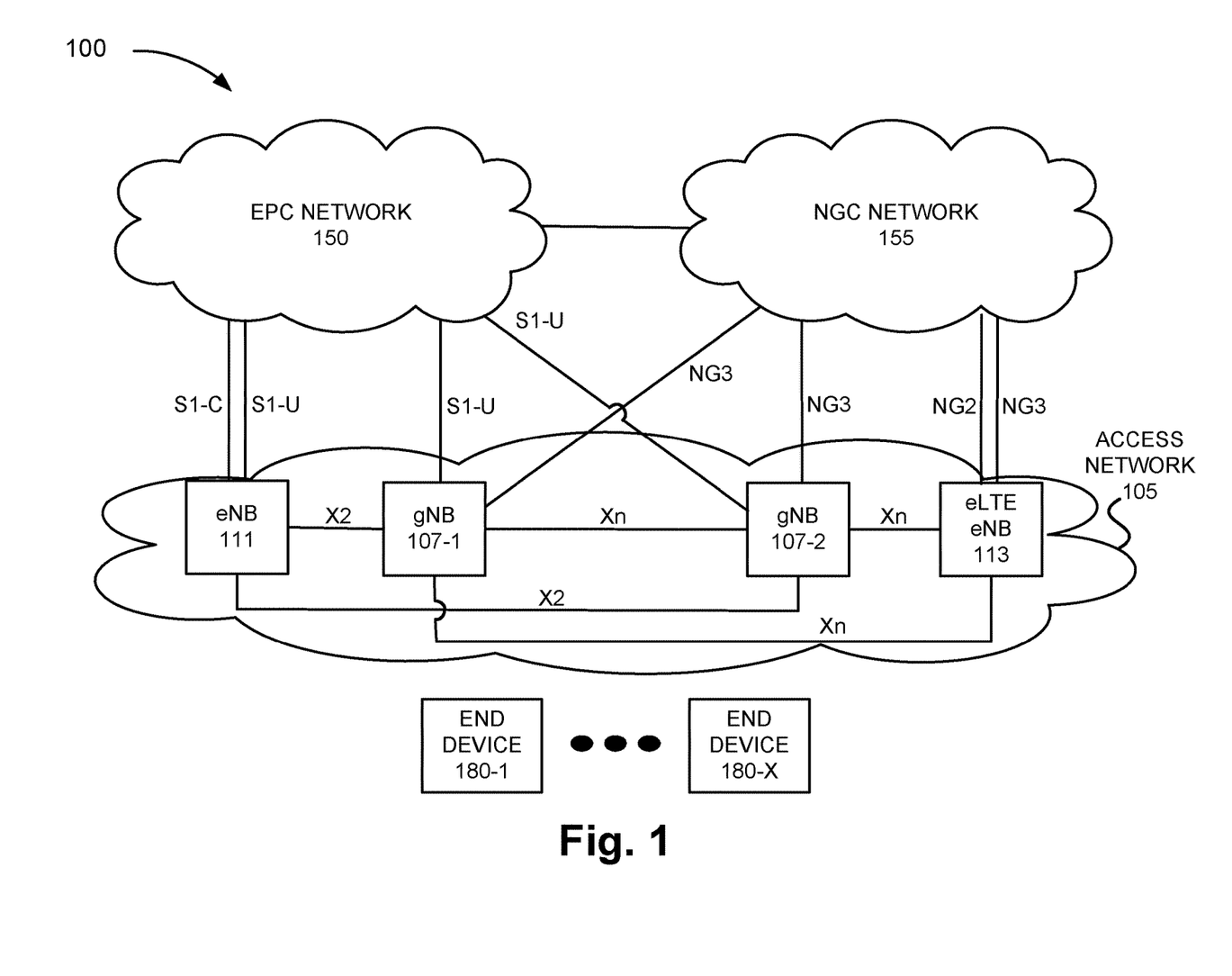
FIG. 1 is a diagram illustrating an exemplary environment in which an exemplary embodiment of an internetworking service may be implemented.

FIG. 1 is a diagram illustrating an exemplary environment 100 in which an exemplary embodiment of the internetworking service may be implemented. As illustrated, environment 100 includes an access network 105, an EPC network 150 and a NGC network 155. According to other embodiments, environment 100 may include additional networks and/or different types of networks than those illustrated and described herein. Access network 105 includes gNBs 107-1 and 107-2 (referred to collectively as gNBs 107 and individually (or generally) as gNB 107). Environment 100 may further include end devices 180-1 through 108-X (referred to collectively as end devices 180 and individually (or generally) as end device 180).

The number, the type, and the arrangement of network devices in access network 105 (also known as network elements or network functions) and the number of end devices 180 are exemplary. A network device, a network element, or a network function (referred to herein simply as a network device) may be implemented according to one or multiple network architectures (e.g., a client device, a server device, a peer device, a proxy device, a cloud device, a virtualized function, etc).

Environment 100 includes communication links between the networks, between the network devices, and between the network devices and the networks. Environment 100 may be implemented to include wired, optical, and/or wireless communication links among the network devices and the networks illustrated. A communicative connection via a communication link may be direct or indirect. For example, an indirect communicative connection may involve an intermediary device and/or an intermediary network not illustrated in FIG. 1. A direct communicative connection may not involve an intermediary device and/or an intermediary network. The number and the arrangement of communication links illustrated in environment 100 are exemplary.

As further illustrated in environment 100, a network device includes an interface that permits communication with another network device. According to various exemplary embodiments of the internetworking service, gNB 107 includes interfaces that support communication with network devices in EPC network 150 and NGC network 155, as well as interfaces that support communication with network devices in access network 105, as described herein.

Access network 105 includes multiple networks of multiple types. According to an exemplary embodiment, access network 105 may include a 4G radio access network (RAN) (e.g., an Evolved UMTS Terrestrial Radio Access Network (E-UTRAN) of an LTE network), a 4.5G RAN (e.g., an E-UTRAN of an LTE-Advanced (LTE-A) network), and a future or next generation RAN (e.g., a 5G-access network (5G-AN) or a 5G-RAN (referred to herein as simply a 5G-RAN)).

According to other exemplary embodiments, access network 105 may include a 4G RAN and a 5G-RAN, or a 4.5G RAN and a 5G-RAN. According to still other exemplary embodiments, access network 105 may include a Third Generation (3G) RAN, a 3.5G RAN, a U-TRAN, a Universal Mobile Telecommunications System (UMTS) RAN, a Global System for Mobile Communications (GSM) RAN, a GSM EDGE RAN (GERAN), a Code Division Multiple Access (CDMA) RAN, a Wideband CDMA (WCDMA) RAN, an Ultra Mobile Broadband (UMB) RAN, a High-Speed Packet Access (HSPA) RAN, an Evolution Data Optimized (EV-DO) RAN, or the like (e.g., a public land mobile network (PLMN), etc.).

According to yet other exemplary embodiments, access network 105 may include other types of networks, such as a WiFi network, a Worldwide Interoperability for Microwave Access (WiMAX) network, a local area network (LAN), a personal area network (PAN), or other type of network that provides access to or can be used as an on-ramp to EPC network 150 and/or NGC network 155.

Depending on the implementation, access network 105 may include various types of network devices that are not illustrated in FIG. 1. For example, access network 105 may include, for example, a base station (BS), a base transceiver station (BTS), a Node B, a remote radio head (RRH), an RRH and a baseband unit (BBU), a BBU, a radio network controller (RNC), a wireless node (e.g., a small cell node (e.g., a picocell device, a femtocell device, a microcell device, a home eNB, a repeater, etc.)), or other type of wireless node (e.g., a WiFi device, a WiMax device, a Bluetooth device, etc.) that provides wireless access to EPC network 150 and/or NGC network 155. According to such various exemplary embodiments, the internetworking service may provide that gNB 107 is configured to connect to a network device of access network 105 and a network device of a core network, which are not illustrated in FIG. 1. As an example, environment 100 may include a 3G RAN and a 3G core network of which gNB 107 may include an interface that provides communication with a Node B of the 3G RAN and a network device of the 3G core network.

According to various exemplary embodiments, access network 105 may be implemented according to various architectures of wireless service, such as, for example, macrocell, microcell, femtocell, picocell, metrocell, non-cell, or other configuration. Additionally, according to various exemplary embodiments, access network 105 may be implemented according to various wireless technologies (e.g., radio access technology (RAT), etc.), wireless standards, wireless frequencies/bands, and so forth.

As illustrated in FIG. 1, however, for purposes of description, exemplary access network 105 includes gNB 107, eNB 111, and eLTE eNB 113. According to various exemplary embodiments, gNB 107, eNB 111, and eLTE eNB 113 may operate and provide a function according to a wireless standard (e.g., 3rd Generation Partnership Project (3GPP), International Telecommunication Union (ITU), etc.) and/or a proprietary technology. According to an exemplary embodiment, access network 105 is configured to provide LTE-New Radio (NR) dual connectivity (DC) service. According to an exemplary embodiment, access network 105 is configured to provide secondary cell group (SCG) split bearer service. Additionally, for example, access network 105 may be configured to support other DC services, such as master cell group (MCG) split bearer, SCG bearer, and so forth.

According to exemplary embodiments, gNB 107 includes logic that provides the internetworking service, as described herein. According to an exemplary embodiment, gNB 107 includes logic that determines, as a binary choice, whether to connect to EPC network 150 or NGC network 155. According to an exemplary embodiment, gNB 107 makes such a determination based on end device capability information. The end device capability information may indicate capabilities of end device 180. For example, the end device capability information may indicate that end device 180 is able to connect to only EPC network 150, only NGC network 155, or both EPC network 150 and NGC network 155. According to various exemplary embodiments, gNB 107 may obtain the end device capability information from end device or from a network device of core network.

As illustrated, gNB 107 includes an X2 interface that allows communication with eNB 111, and an Xn interface that allows communication with eLTE eNB 113. The X2 interface and the Xn interface support various planes of communication, such as for example, a control plane and a user plane. Additionally, gNB 107 includes an S1-U interface that allows communication with EPC network 150 on the user plane (e.g., with a serving gateway (SGW)) a packet data network gateway (PGW), etc.), and an NG3 interface that allows communication with NGC network 155 on the user plane (e.g., with a user plane function (UPF), etc.). Even further, although not illustrated, gNB 107 includes an interface (e.g., Uu interface, etc.) that allows communication with end device 180. According to other exemplary embodiments, gNB 107 may include additional and/or different interfaces. For example, gNB 107 may include an interface that allows communication according to a different wireless standard (e.g., 3G, 3.5G, WiFi, WiMax, etc.) and/or communication with other types of network devices.

EPC network 150 includes a core network. For example, although not illustrated, EPC network 150 may include various network devices that support the core part of an LTE network or an LTE-A network. By way of further example, EPC network 150 may include a mobility management entity (MME), a PGW, an SGW, a home subscriber server (HSS), an authentication, authorization, and accounting (AAA) server, a policy charging and rules function (PCRF), and a charging system (CS). According to other exemplary embodiments, EPC network 150 may include additional, different, and/or fewer network devices than those described.

NGC network 155 includes a core network. For example, although not illustrated, NGC network 155 may include various network devices that support the core part of a next generation network. By way of further example, NGC network 155 may include a UPF, an access and mobility management function (AMF), a session management function (SMF), a unified data management (UDM) device, an authentication server function (AUSF), a network slice selection function (NSSF), a network repository function (NRF), a policy control function (PCF), and a charging system (CS). According to other exemplary embodiments, the next generation core network may include additional, different, and/or fewer network devices than those described.

End device 180 includes a device that has computational and wireless communication capabilities. End device 180 may be implemented as a mobile device, a portable device, or a stationary device. End device 180 may be implemented as a Mobile Broadband device, a Machine Type Communication (MTC) device, an Internet of Things (IoT) device, an enhanced MTC device (eMTC) (also known as Cat-M1), a NarrowBand IoT (NB-IoT) device, a machine-to-machine (M2M) device, a user device, or some other type of wireless end node. By way of further example, end device 180 may be implemented as a smartphone, a personal digital assistant, a tablet, a netbook, a phablet, a wearable device, a set top box, an infotainment system in a vehicle, a vehicle support system, a smart television, a game system, a music playing system, or some other type of wireless user device. According to various exemplary embodiments, end device 180 may be configured to execute various types of software (e.g., applications, programs, etc.). The number and the types of software may vary among end devices 180. End device 180 may support multiple radio access technologies (RATs) (e.g., 4G, 5G, etc.), multiple frequency bands, and so forth. Additionally, end device 180 may include one or multiple communication interfaces that provide one or multiple (e.g., simultaneous) connections via the same or different RATs, frequency bands, and so forth. The multimode capabilities of end device 180 may vary among end devices 180.

According to an exemplary embodiment, end device 180 includes logic that supports the internetworking service, as described herein. For example, end device 180 includes logic that generates and transmits a message that includes end device capability information, as described herein.

Figure 2A:
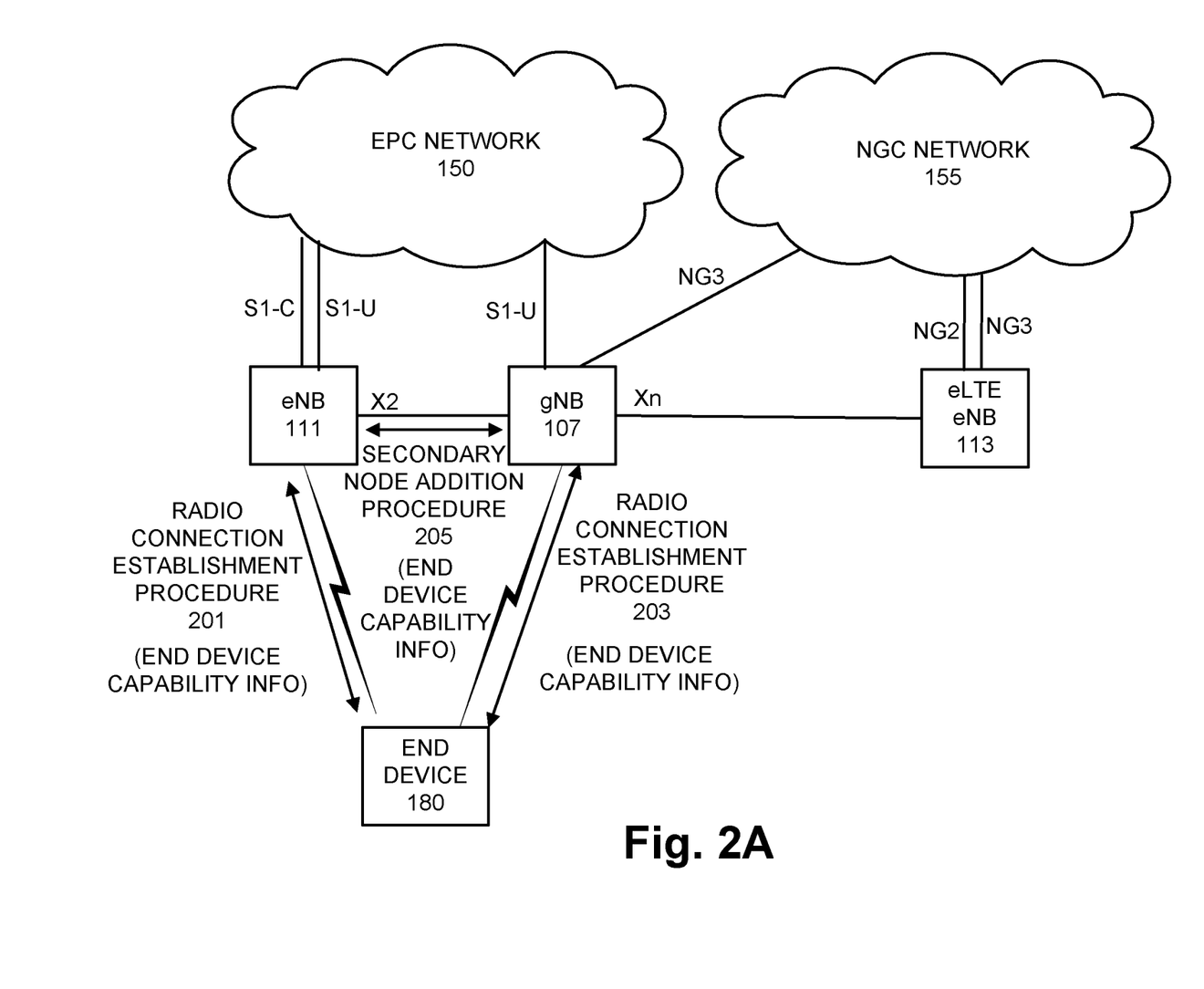
FIGS. 2A-2C are diagrams illustrating an exemplary process of an exemplary embodiment of the internetworking service.
Figure 2B:
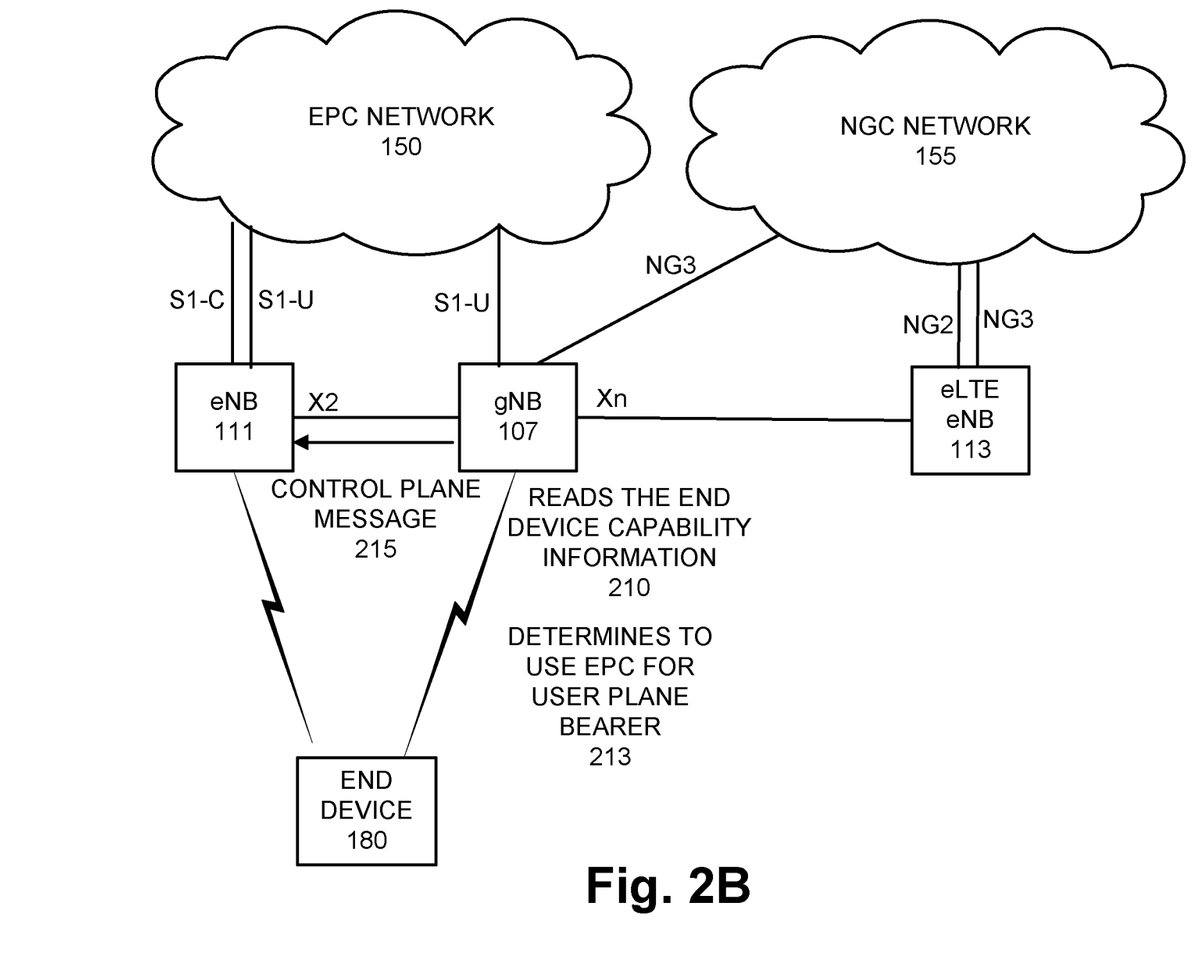
Figure 2C:
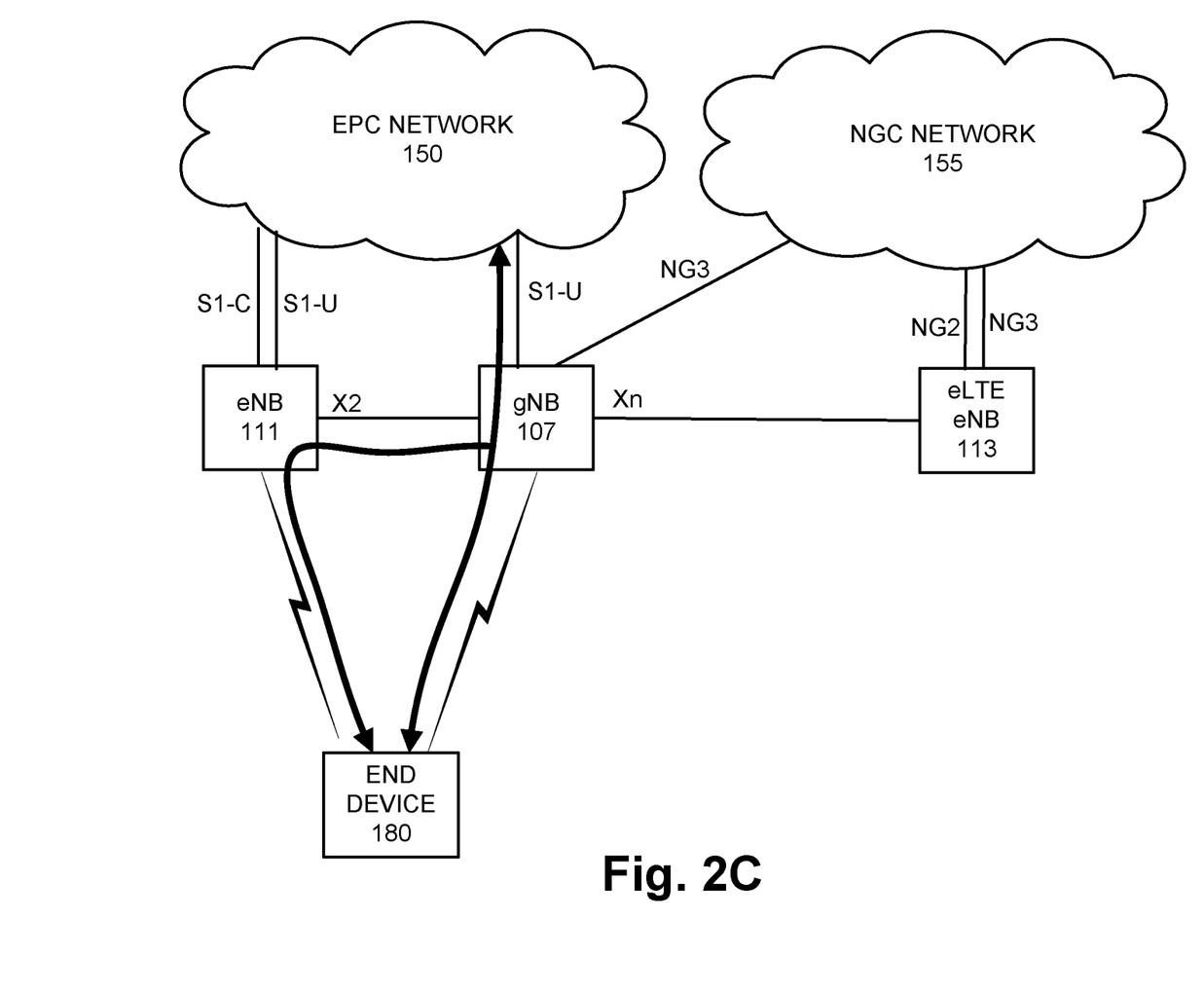

FIGS. 2A-2C are diagrams illustrating an exemplary process of the internetworking service. According to this exemplary scenario, end device 180 may be configured to communicate with EPC network 150 but not NGC network 155. Referring to FIG. 2A, end device 180 may establish a radio connection with eNB 111, gNB 107, or both. As illustrated, the establishment of the radio connection may include the performance of a radio connection establishment procedure 201 or a radio connection establishment procedure 203. According to an exemplary implementation, the radio connection establishment procedure may include the exchange of Radio Resource Control (RRC) messages. Additionally, or alternatively, the establishment of the radio connection may include the performance of a secondary node addition procedure 205. For example, a master node (e.g., eNB 111) may select a secondary node (e.g., gNB 107) for dual connectivity (DC), and may transmit an addition request to the secondary node. The secondary node may determine whether radio resources may be allocated, and according to an exemplary scenario in which an SCG split bearer may be set up, whether transport network resources may be allocated. The secondary node may generate and transmit a response, which may include acceptance and configuration information, to eNB 111.

According to various exemplary embodiments, a message of the radio connection establishment procedure or a secondary node addition procedure may carry end device capability information. According to other exemplary embodiments, the end device capability information may be carried in a message associated with a different procedure (e.g., a random access procedure, an RRC Connection Reconfiguration procedure, a bearer procedure in which the bearer is anchored at the secondary node, a handover procedure, etc.) a dedicated message, or a control plane message (e.g., a Network Access Stratum (NAS) message).

The message may include an end device capability Information Element (IE) that indicates a capability of end device 180. According to an exemplary implementation, the end device capability information may indicate whether or not end device 180 is able to communicate (e.g., support a bearer in the user plane) with NGC network 155 (e.g., a UPF). According to another exemplary implementation, the end device capability information may indicate whether or not end device 180 is able to communicate (e.g., support a bearer in the user plane) with EPC network 150 (e.g., an SGW, a PGW, etc.). According to yet another exemplary implementation, the end device capability information may indicate whether or not end device 180 is able to communicate (e.g., support a bearer in the user plane) with both EPC network 150 and NGC network 155.

Referring to FIG. 2B, in response to receiving the message, which carries the end device capability information, gNB 107 reads the end device capability information 210. According to this exemplary scenario, assume that the end device capability information indicates that end device 180 supports a bearer only from EPC network 150. Based on the end device capability information, gNB 107 determines to use EPC network 150 (and not NGC network 155) for user plane bearer service 213 on behalf of end device 180. Referring to FIG. 2C, according to this exemplary scenario, an SCG split bearer is setup and established in which the S1-U bearer is anchored at gNB 107 and split at gNB 107 with eNB 111 via the X2 interface. According to an exemplary embodiment, as a part of the setup of the SCG split bearer, gNB 107 may generate and transmit a control plane message 215 to EPC network 150 via eNB 111 (as illustrated in FIG. 2B). For example, the control plane message 215 may initiate the setting up of a bearer for end device 180.

Although FIGS. 2A-2C illustrate an exemplary process of the internetworking service, according to other exemplary embodiments, the process may include additional, different, and/or fewer steps, include additional, different, and/or fewer messages, and/or involve additional, different, and/or fewer network devices. For example, according to another exemplary scenario, the end device capability information may indicate that end device 180 supports a bearer only from NGC 155. According to this example, gNB 107 determines to use NGC network 155 for user plane bearer service. According to yet another exemplary scenario, the end device capability information may indicate that end device 180 supports a bearer from both EPC network 150 and NGC network 155. According to this example, gNB 107 may determine to use EPC network 150 or NGC network 155. For example, depending on a category of an application/bearer session (e.g., real-time, virtual reality, web browsing, mission critical, etc.) and/or network resource utilization values associated with the application/bearer session (e.g., amount of bandwidth/bitrate, processor, etc.), gNB 107 may select EPC network 150 or NGC network 155. According to an exemplary implementation, gNB 107 may select EPC network 150 to support bearers that may be less network resource intensive, and select NGC network 155 to support bearers that may be more network resource intensive based on the category of application/bearer session and/or network resource utilization values.

Figure 3A:
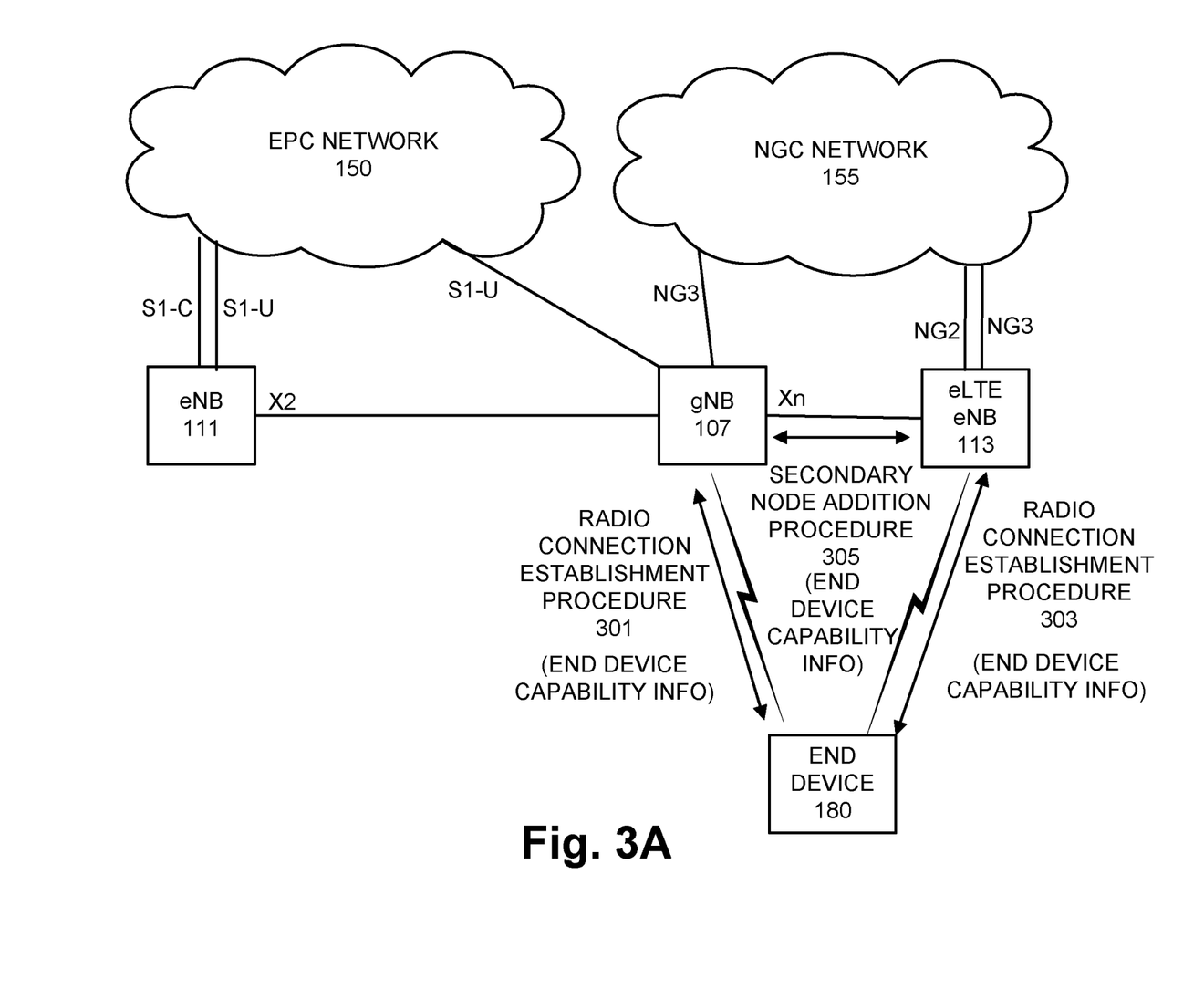
FIGS. 3A-3C are diagrams illustrating another exemplary process of an exemplary embodiment of the internetworking service.
Figure 3B:
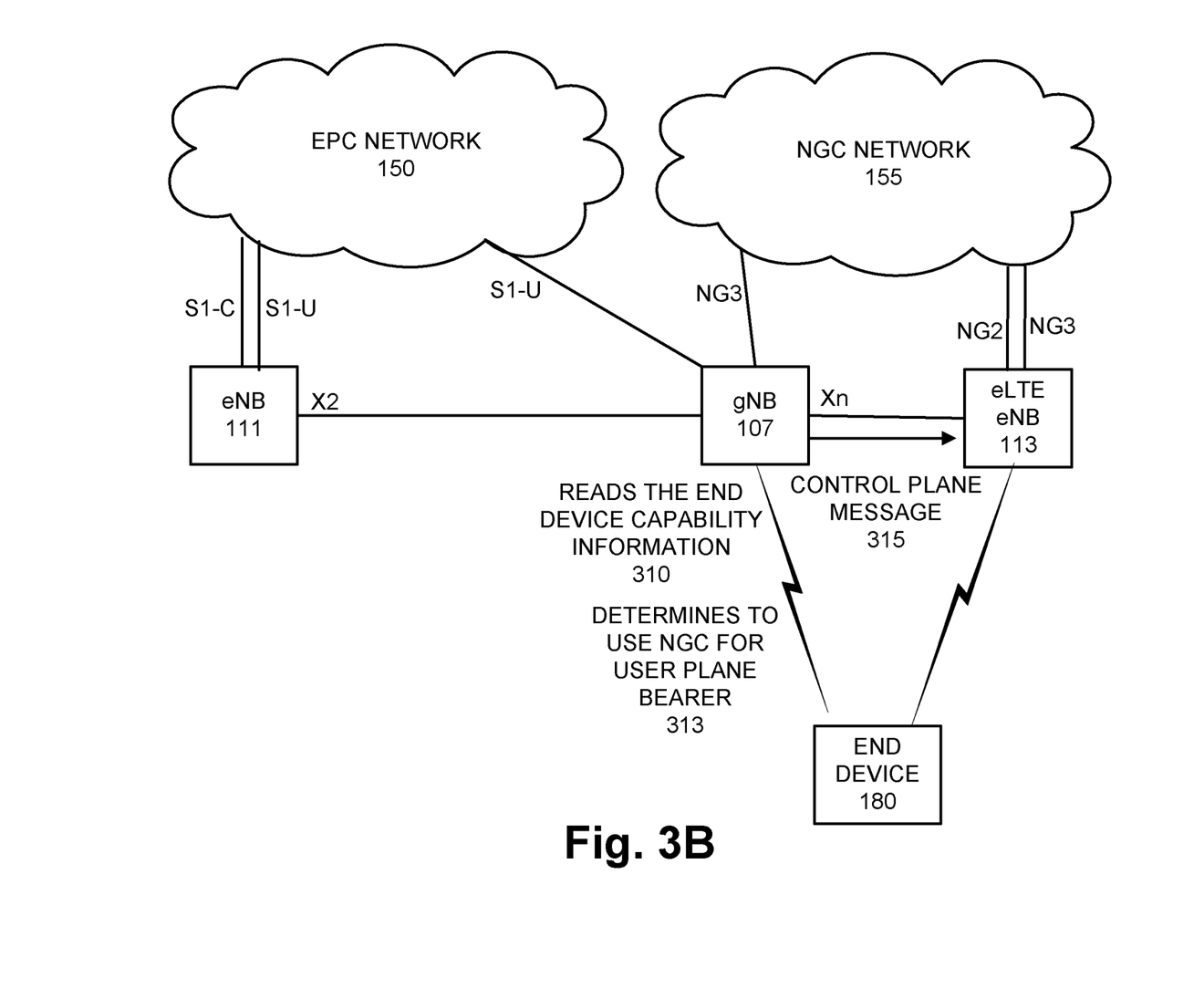
Figure 3C:
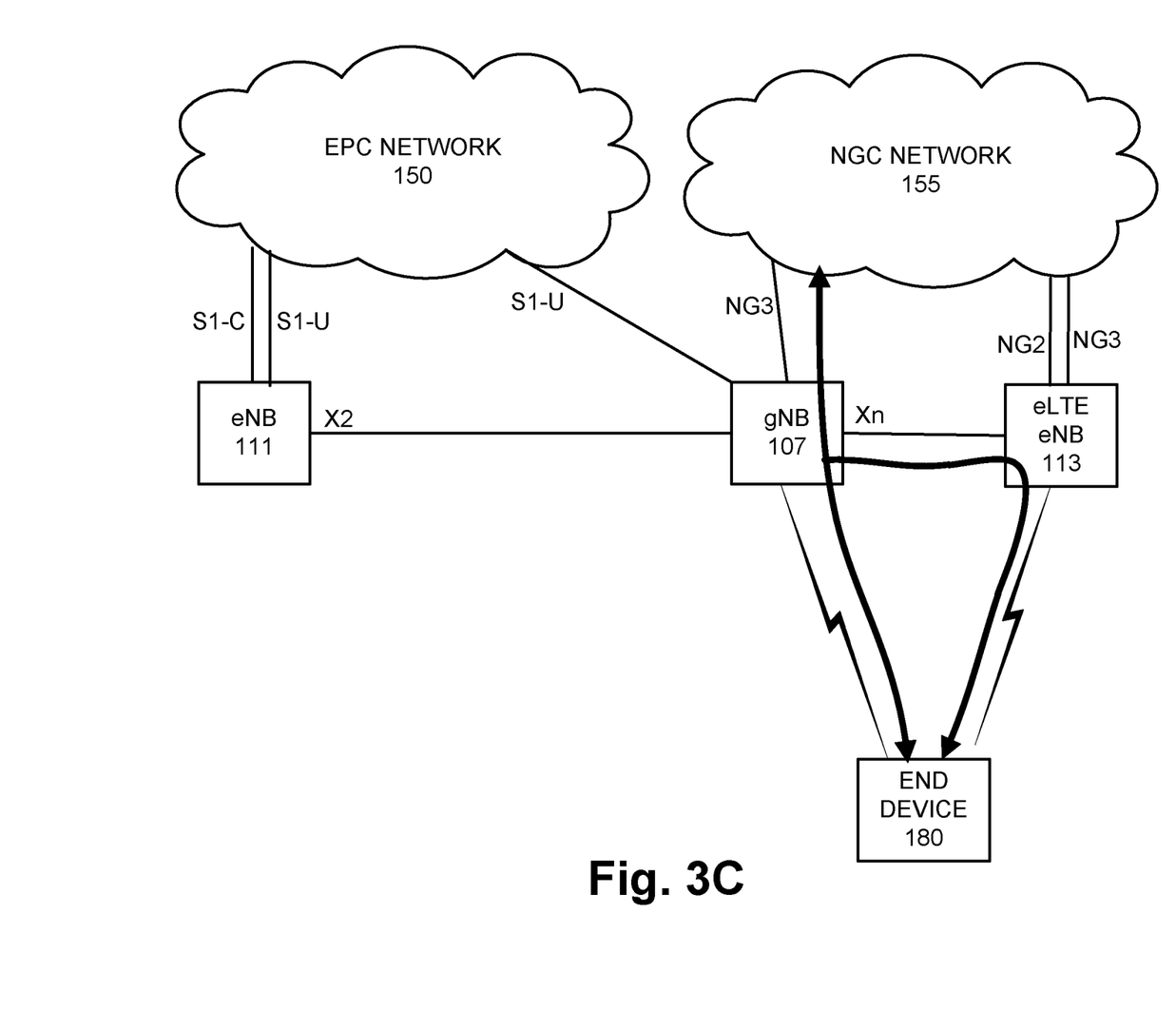

FIGS. 3A-3C are diagrams illustrating another exemplary process of the internetworking service. According to this exemplary scenario, end device 180 may be configured to communicate with both EPC network 150 and NGC network 155. Referring to FIG. 3A, end device 180 may establish a radio connection with eLTE eNB 113, gNB 107, or both. As illustrated, the establishment of the radio connection may include the performance of a radio connection establishment procedure 301 or a radio connection establishment procedure 303. The radio connection establishment procedure may include the exchange of RRC messages. Additionally, or alternatively, the establishment of the radio connection may include the performance of a secondary node addition procedure 305. For example, a master node (e.g., eLTE eNB 113) may select a secondary node (e.g., gNB 107) for DC, and may transmit an addition request to the secondary node. The secondary node may determine whether radio resources may be allocated, and according to an exemplary scenario in which an SCG split bearer may be set up, whether transport network resources may be allocated. The secondary node may generate and transmit a response, which may include acceptance and configuration information, to eLTE eNB 113.

According to various exemplary embodiments, a message of the radio connection establishment procedure or a secondary node addition procedure may carry end device capability information. According to other exemplary embodiments, the end device capability information may be carried in a message associated with a different procedure (e.g., a random access procedure, an RRC Connection Reconfiguration procedure, a bearer procedure in which the bearer is anchored at the secondary node, a handover procedure, etc.), a dedicated message, or a control plane message (e.g., a NAS message).

The message may include an end device capability IE that indicates a capability of end device 180. According to an exemplary implementation, the end device capability information may indicate whether or not end device 180 is able to communicate (e.g., support a bearer in the user plane) with NGC network 155 (e.g., a UPF). According to another exemplary implementation, the end device capability information may indicate whether or not end device 180 is able to communicate (e.g., support a bearer in the user plane) with EPC network 150 (e.g., an SGW, a PGW, etc.). According to yet another exemplary implementation, the end device capability information may indicate whether or not end device 180 is able to communicate (e.g., support a bearer in the user plane) with both EPC network 150 and NGC network 155.

Referring to FIG. 3B, in response to receiving the message, which carries the end device capability information, gNB 107 reads the end device capability information 310. According to this exemplary scenario, assume that the end device capability information indicates that end device 180 supports a bearer from EPC network 150 and NGC network 155. Further, based on the end device capability information, assume gNB 107 determines to use NGC network 155 for user plane bearer service 213 on behalf of end device 180. According to another exemplary scenario, gNB 107 may determine to use EPC network 150 since the end device capability information indicates that end device 180 may support a bearer with either of the core networks.

Referring to FIG. 3C, according to this exemplary scenario, an SCG split bearer is setup and established in which the S1-U bearer is anchored at gNB 107 and split at gNB 107 with eLTE eNB 113. According to an exemplary embodiment, as a part of the setup of the SCG split bearer, gNB 107 may generate and transmit a control plane message 315 to NGC network 155 via eLTE eNB 113 (as illustrated in FIG. 3B). For example, the control plane message 315 may initiate the setting up of a bearer for end device 180.

Although FIGS. 3A-3C illustrate an exemplary process of the internetworking service, according to other exemplary embodiments, the process may include additional, different, and/or fewer steps, include additional, different, and/or fewer messages, and/or involve additional, different, and/or fewer network devices. For example, according to another exemplary scenario, the end device capability information may indicate that end device 180 supports a bearer only from EPC network 150. According to this example, gNB 107 determines to use EPC network 150 for user plane bearer service. According to yet another exemplary scenario, the end device capability information may indicate that end device 180 supports a bearer from only NGC network 155. According to this example, gNB 107 may determine to use NGC network 155. According to yet another example, when end device 180 supports a bearer from EPC network 150 and NGC 155, gNB 107 may determine to use EPC network 150 for user plane bearer service. As previously described, according to an exemplary embodiment, gNB 107 may select from the binary choice of EPC network 150 and NGC network 155 based on the category of application/bearer service and/or network resource utilization values associated with the bearer. According to other exemplary embodiments, gNB 107 may be configured with a preference to select NGC network 155. For example, absent gNB 107 being notified of congestion in NGC network 155 and/or other types of prohibitive reasons, gNB 107 may select NGC network 155.

Figure 4:
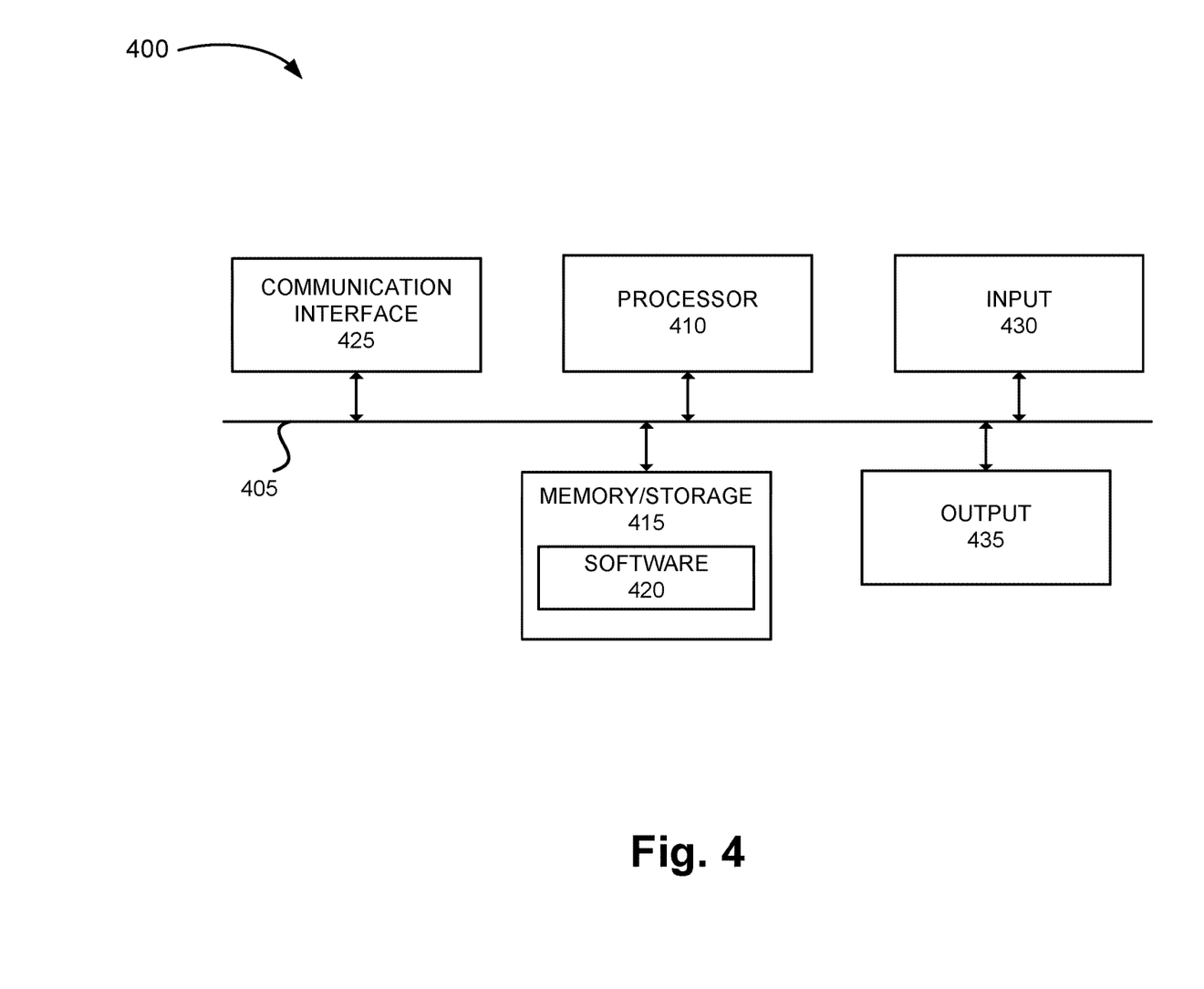
FIG. 4 is a diagram illustrating exemplary components of a device that may correspond to one or more of the devices illustrated and described herein.

FIG. 4 is a diagram illustrating exemplary components of a device 400 that may be included in one or more of the devices described herein. For example, device 400 may correspond to components included in network devices of access network 105, network devices in a core network (e.g., EPC network 150, NGC network 155), and end device 180. As illustrated in FIG. 4, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, clocks, and so forth.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc.

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, a random access memory (RAM), a dynamic random access memory (DRAM), a static random access memory (SRAM), a cache, a read only memory (ROM), a programmable read only memory (PROM), an erasable PROM (EPROM), an electrically EPROM (EEPROM), a single in-line memory module (SIMM), a dual in-line memory module (DIMM), a flash memory (e.g., 2D, 3D, NOR, NAND, etc.), a solid state memory, and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include drives for reading from and writing to the storage medium.

Memory/storage 415 may be external to and/or removable from device 400, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. As an example, with reference to gNB 107, software 420 may include an application that, when executed by processor 410, provides the functions of the internetworking service, as described herein. Additionally, with reference to end device 180, software 420 may include an application that, when executed by processor 410, provides the functions of the internetworking service, as described herein. Further, with reference to network devices of EPC network 150 and NGC network 155, software 420 may include an application that, when executed by processor 410, provides the functions of the internetworking service, as described herein. Software 420 may also include firmware, middleware, microcode, hardware description language (HDL), and/or other form of instruction. Software 420 may further include an operating system (OS) (e.g., Windows, Linux, Android, proprietary, etc.).

Communication interface 425 permits device 400 to communicate with other devices, networks, systems, and/or the like. Communication interface 425 includes one or multiple wireless interfaces and/or wired interfaces. For example, communication interface 425 may include one or multiple transmitters and receivers, or transceivers. Communication interface 425 may operate according to a protocol stack and a communication standard. Communication interface 425 may include an antenna. Communication interface 425 may include various processing logic or circuitry (e.g., multiplexing/de-multiplexing, filtering, amplifying, converting, error correction, application programming interface (API), etc.). Communication interface 425 may be implemented as a point-to-point interface, a service based interface, etc.

Input 430 permits an input into device 400. For example, input 430 may include a keyboard, a mouse, a display, a touchscreen, a touchless screen, a button, a switch, an input port, speech recognition logic, and/or some other type of visual, auditory, tactile, etc., input component. Output 435 permits an output from device 400. For example, output 435 may include a speaker, a display, a touchscreen, a touchless screen, a light, an output port, and/or some other type of visual, auditory, tactile, etc., output component.

As previously described, a network device may be implemented according to various computing architectures (e.g., in a cloud, etc.) and according to various network architectures (e.g., a virtualized function, etc.). Device 400 may be implemented in the same manner. For example, device 400 may be instantiated, spun up, spun down, etc., using well-known virtualization techniques in a public/private cloud or other type of network.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5:
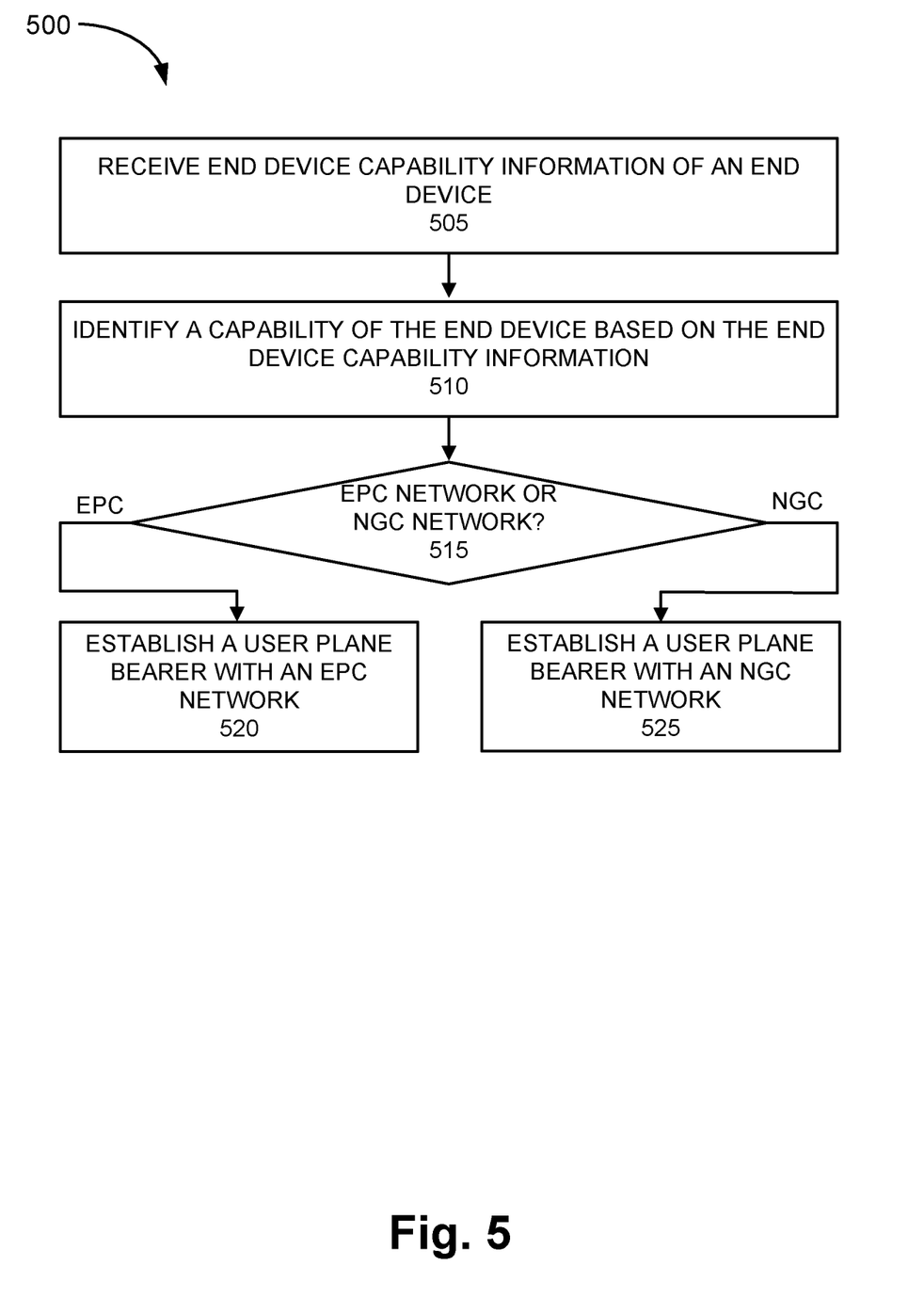
FIG. 5 is a flow diagram illustrating an exemplary process of an exemplary embodiment of the internetworking service.

FIG. 5 is a flow diagram illustrating an exemplary process 500 of an exemplary embodiment of the internetworking service. According to an exemplary embodiment, a RAN device (e.g., gNB 107) performs steps of process 500. For example, processor 410 executes software 420 to perform the steps illustrated in FIG. 5, and described herein.

Referring to FIG. 5, in block 505, end device capability information of an end device may be received. For example, gNB 107 may receive end device capability information from end device 180, such as directly (between gNB 107 and end device 180) or indirectly (e.g., via eNB 111, eLTE eNB 113, etc.). The end device capability information may include information that indicates whether or not end device 180 is able to communicate (e.g., support a bearer in the user plane) with NGC network 155 (e.g., a UPF). In block 510, a capability of the end device may be identified based on the end device capability information. For example, gNB 107 may read the end device capability information included in a message, and determine a type of end device 180. For example, gNB 107 may determine whether or not end device 180 is able to support a bearer in the user plane with NGC network 155. According to another example, gNB 107 may determine whether or not end device 180 is able to support a bearer with both EPC network 150 and NGC network 155. According to yet another example, gNB 107 may determine whether or not end device 180 is able to support a bearer with EPC network 150. According to an exemplary embodiment, gNB 107 may select from a binary choice, such as between EPC network 150 and NGC network 155.

When it is determined that a user plane bearer is to be established with a legacy core network (block 515—EPC), the user plane bearer is established with the legacy core network (block 520). For example, when it is determined that end device 180 does not support a bearer in the user plane with NGC network 155, gNB 107 establishes a bearer with EPC network 150 via an S1-U interface or other suitable interface.

When it is determined that a user plane bearer is to be established with the future generation core network (block 515—NGC), the user plane bearer is established with the future generation core network (block 525). For example, when it is determined that end device 180 does support a bearer in the user plane with NGC network 155, gNB 107 establishes a bearer with NGC network 155 via the NG3 interface or other suitable interface.

Although FIG. 5 illustrates an exemplary process 500 of the internetworking service, according to other embodiments, process 500 may include additional operations, fewer operations, and/or different operations than those illustrated in FIG. 5, and described herein. For example, when the end device capability information indicates that end device 180 supports a bearer from EPC network 150 and NGC network 155, gNB 107 may select either of these core networks, as described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while a series of blocks has been described with regard to the process illustrated in FIG. 5, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information.

Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A method comprising:
   receiving, by a network device of a radio access network, a message from an end device via a radio network interface, wherein the message includes capability information of the end device, and wherein the network device includes a first network interface to a first core network and a second network interface to a second core network, and wherein the network device is a next generation Node B (gNB);
   determining, by the network device in response to the receiving, whether to establish a first bearer, which pertains to the end device, with the first core network via the first network interface, or a second bearer, which pertains to the end device, with the second core network via the second network interface based on the capability information, wherein the first bearer is a direct connection with the first core network and the second bearer is a direct connection with the second core network; and
   establishing, by the network device based on the determining, the first bearer or the second bearer.

2. The method of claim 1, wherein the first core network is an evolved packet core (EPC) network, and the second core network is a next generation core (NGC) network, and wherein the first bearer with the first core network and the second bearer with the second core network is a binary choice.

3. The method of claim 1, wherein the capability information indicates that the end device can support the second bearer with the second core network, and wherein the establishing further comprises:
   establishing, by the network device based on the determining, the second bearer.

4. The method of claim 1, wherein the capability information indicates that the end device can support the first bearer with the first core network and the second bearer with the second core network.

5. The method of claim 1, wherein the capability information indicates that the end device can support only the first bearer with the first core network, and wherein the establishing further comprises:
   establishing, by the network device based on the determining, the first bearer.

6. The method of claim 1, wherein the network device includes a third network interface to an evolved Node B of the radio access network, and wherein the establishing comprises:
   establishing, by the network device, the first bearer that includes a secondary cell group split bearer with the end device and the evolved Node B via the third network interface.

7. The method of claim 1, wherein the network device includes a fourth network interface to an evolved Long Term Evolution (eLTE) evolved Node B (eNB) of the radio access network, and wherein the establishing comprises:
   establishing, by the network device, the second bearer that includes a secondary cell group split bearer with the end device and the eLTE eNB via the fourth network interface.

8. The method of claim 1, further comprising:
   generating, by the network device based on the determining, a control plane message that indicates to set up a user plane bearer pertaining to the end device; and
   transmitting, by the network device to a first network device of the first core network via the first network interface or a second network device of the second core network via the second network interface.

9. A network device comprising:
   a radio communication interface;
   a first communication interface to a first core network;
   a second communication interface to a second core network;
   a memory, wherein the memory stores instructions; and
   a processor, wherein the processor executes the instructions to:
      receive, via the radio communication interface, a message from an end device, wherein the message includes capability information of the end device, and wherein the network device is a part of a radio access network, and wherein the network device is a next generation Node B (gNB);
      determine, in response to the receipt of the message, whether to establish a first bearer, which pertains to the end device, with the first core network via the first network interface, or a second bearer, which pertains to the end device, with the second core network via the second network interface based on the capability information, wherein the first bearer is a direct connection with the first core network and the second bearer is a direct connection with the second core network; and
      establish, based on a determination, the first bearer or the second bearer.

10. The network device of claim 9, wherein the first core network is an evolved packet core (EPC) network, and the second core network is a next generation core (NGC) network, and wherein the first bearer with the first core network and the second bearer with the second core network is a binary choice.

11. The network device of claim 9, wherein the capability information indicates that the end device can support the second bearer with the second core network, and wherein, when establishing, the processor further executes the instructions to:
   establish, via the second network interface based on the determination, the second bearer.

12. The network device of claim 9, wherein the capability information indicates that the end device can support the first bearer with the first core network and the second bearer with the second core network.

13. The network device of claim 9, wherein the capability information indicates that the end device can support only the first bearer with the first core network, and wherein, when establishing, the processor further executes the instructions to:
   establish, via the first network interface based on the determination, the first bearer.

14. The network device of claim 9, wherein the network device includes a third network interface to an evolved Node B of the radio access network, and wherein, when establishing, the processor further executes the instructions to:
   establish the first bearer that includes a secondary cell group split bearer with the end device and the evolved Node B via the third network interface.

15. The network device of claim 9, wherein the network device includes a fourth network interface to an evolved Long Term Evolution (eLTE) evolved Node B (eNB) of the radio access network, and wherein, when establishing, the processor further executes the instructions to:
   establish, the second bearer that includes a secondary cell group split bearer with the end device and the eLTE eNB via the fourth network interface.

16. A non-transitory, computer-readable storage medium storing instructions executable by a processor of a device, which when executed cause the device to:
   receive, via a radio communication interface of the device, a message from an end device, wherein the message includes capability information of the end device, and wherein the device is a part of a radio access network, and wherein the device is a next generation Node B (gNB);
   determine, in response to the receipt of the message, whether to establish a first bearer, which pertains to the end device, with a first core network via a first network interface of the device, or a second bearer, which pertains to the end device, with a second core network via a second network interface of the device based on the capability information, wherein the first bearer is a direct connection with the first core network and the second bearer is a direct connection with the second core network; and
   establish, based on a determination, the first bearer or the second bearer.

17. The non-transitory, computer-readable storage medium of claim 16, wherein the first core network is an evolved packet core (EPC) network, and the second core network is a next generation core (NGC) network, and wherein the first bearer with the first core network and the second bearer with the second core network is a binary choice.

18. The non-transitory, computer-readable storage medium of claim 16, wherein the capability information indicates that the end device can support only the first bearer with the first core network, and wherein the instructions to establish further comprise instructions to:
   establish, based on the determination, the first bearer.

19. The non-transitory, computer-readable storage medium of claim 16, wherein the device includes a third network interface to an evolved Node B of the radio access network, and wherein the instructions to establish further comprise instructions to:
   establish the first bearer that includes a secondary cell group split bearer with the end device and the evolved Node B via the third network interface.

20. The non-transitory, computer-readable storage medium of claim 16, wherein the device includes a fourth network interface to an evolved Long Term Evolution (eLTE) evolved Node B (eNB) of the access network, and wherein the instructions to establish further comprise instructions to:
   establish the second bearer that includes a secondary cell group split bearer with the end device and the eLTE eNB via the fourth network interface.

* * * * *